United States Patent [19]

Schwarz

[11] Patent Number: 5,007,175
[45] Date of Patent: Apr. 16, 1991

[54] SYSTEM FOR MATERIALIZING A POINT IN SPACE, APPLICATIONS THEREOF AND A TOOLING ASSEMBLY FOR SAID SYSTEM

[75] Inventor: Jean-Claude Schwarz, Le Puy Sainte Reparade, France

[73] Assignee: Aerospatiale Societe Nationale Industrielle, Paris, France

[21] Appl. No.: 482,548

[22] Filed: Feb. 21, 1990

[30] Foreign Application Priority Data

Feb. 21, 1989 [FR] France ................ 89 02243

[51] Int. Cl.$^5$ ............................................. G01C 3/00
[52] U.S. Cl. ..................................... 33/286; 33/1 T; 33/228; 33/276; 33/299; 356/145
[58] Field of Search ............. 33/286, 520, 1 T, 228, 33/227, 276, 275 R, 293, 299; 356/140, 144, 145

[56] References Cited

U.S. PATENT DOCUMENTS

| | | | |
|---|---|---|---|
| 2,111,516 | 3/1938 | Roux | 3/286 |
| 2,629,936 | 3/1953 | Cronstedt | 33/520 |
| 2,904,890 | 9/1959 | Vajda | 33/293 |
| 3,188,739 | 6/1965 | Olsen et al. | 33/293 |
| 3,731,543 | 5/1973 | Gates | 33/318 X |
| 3,816,935 | 6/1974 | Wilmot | 33/228 |
| 3,851,399 | 12/1974 | Edwards | 33/228 |
| 3,895,871 | 7/1975 | Strasser | 33/1 T |
| 4,138,824 | 2/1979 | Leon | 33/185 |
| 4,483,080 | 11/1984 | Knoll | 33/286 |
| 4,593,474 | 6/1986 | Mayhew | 33/264 |
| 4,845,856 | 7/1989 | Rochette | 33/286 |

OTHER PUBLICATIONS

Behrens et al., V.D.I. Zeitschrift, vol. 129, No. 3, Mar. 1987, pp. 57 to 62.
Lardelli, Microtecnic, No. 3, (1984), pp. 40 to 43.

Primary Examiner—William A. Cuchlinski, Jr.
Assistant Examiner—William C. Dowling
Attorney, Agent, or Firm—Fisher, Christen & Sabol

[57] ABSTRACT

A system is disclosed for materializing in space a point whose coordinates in a system of reference axes are known, comprising:

an optical aiming apparatus, occupying a pre-determined position with respect to said system of axes and making it possible to determine, in said system of axes, the coordinates of any point aimed at, and a tooling assembly comprising a stand, one part at least of which is movable with respect to said system of axes and a hemispherical ball joint mounted in a spherical concave seat fixed to said movable part of the stand, the center of said ball joint being marked so as to be visible by said aiming apparatus.

27 Claims, 7 Drawing Sheets

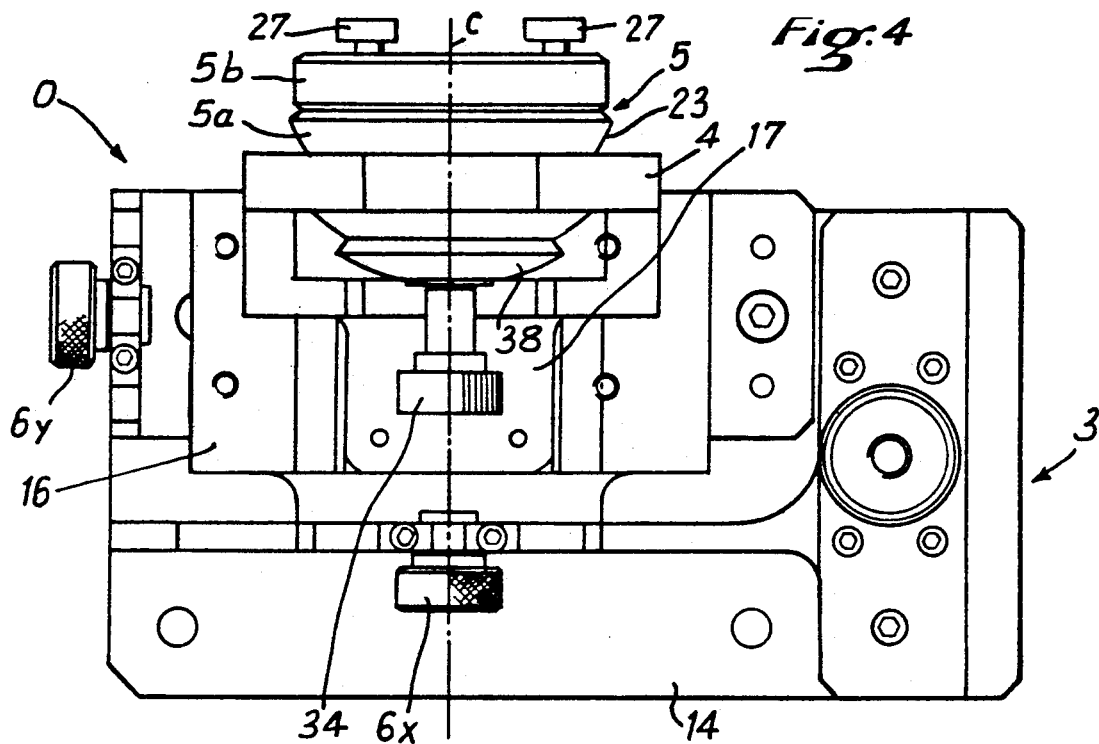
Fig. 4
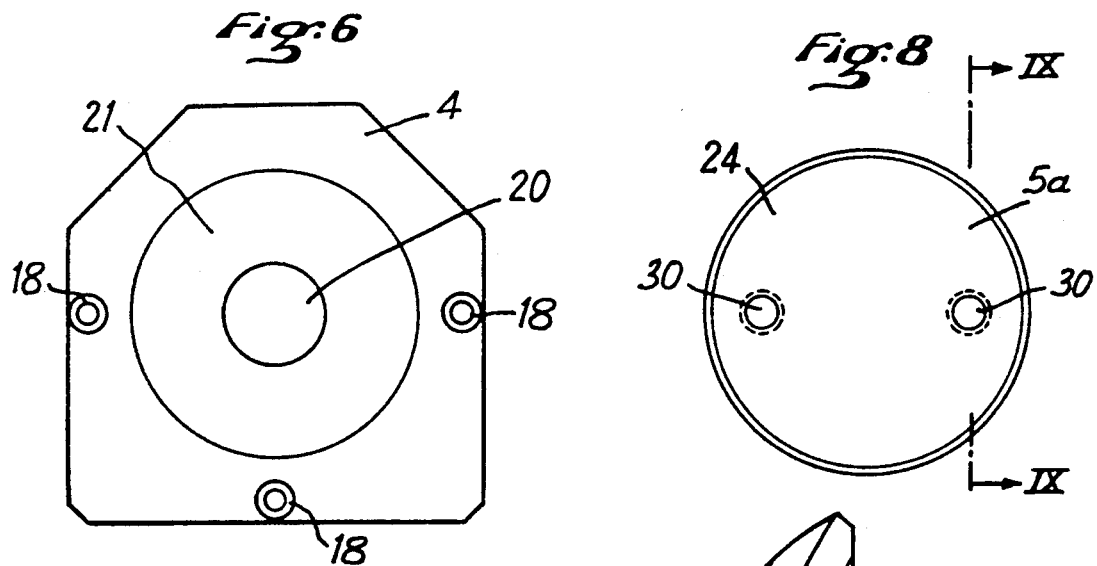
Fig. 6
Fig. 8
Fig. 7
Fig. 9

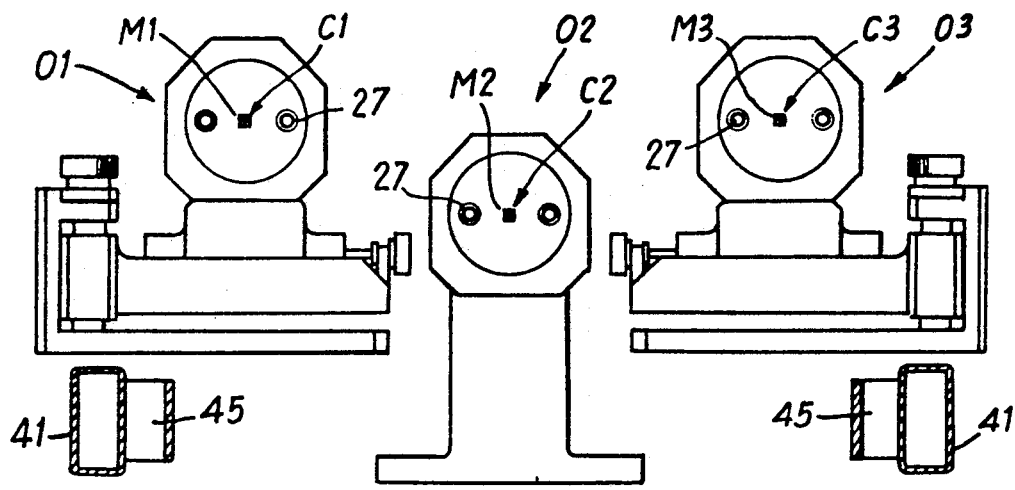
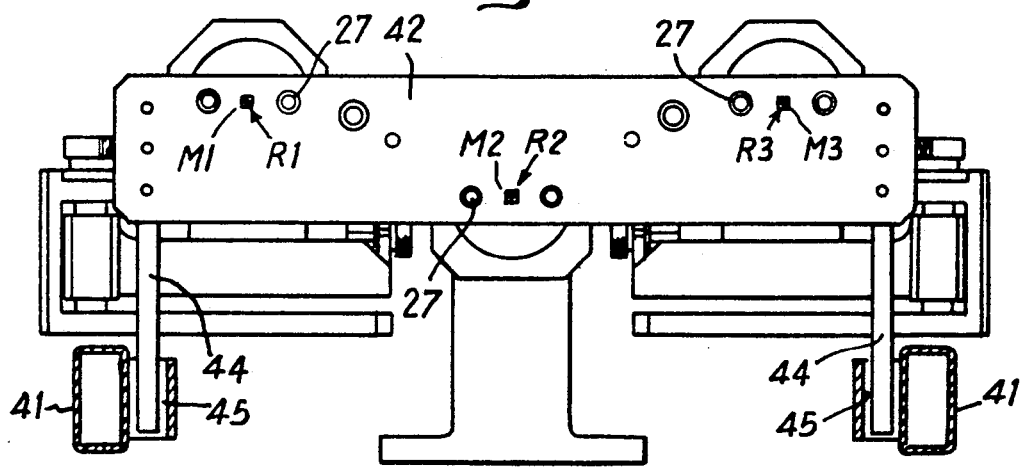
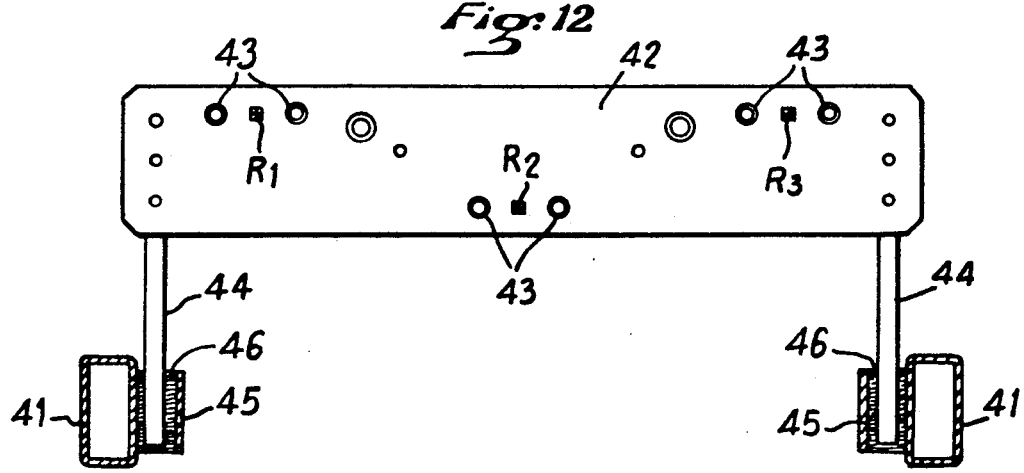

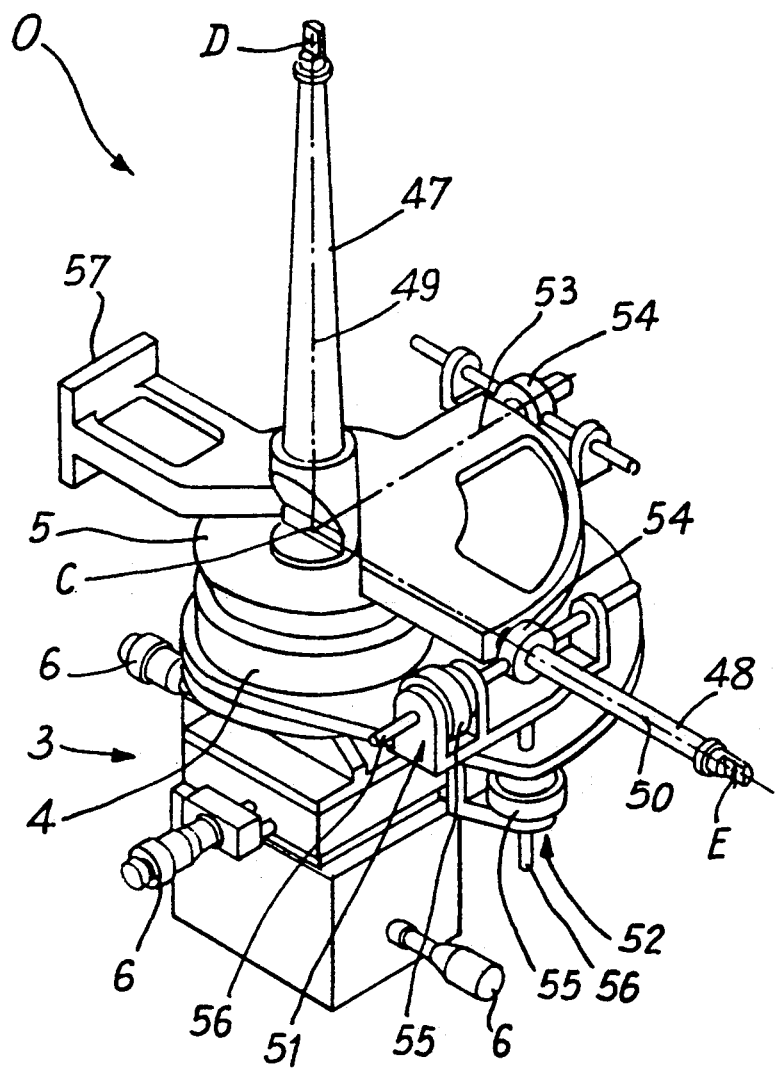

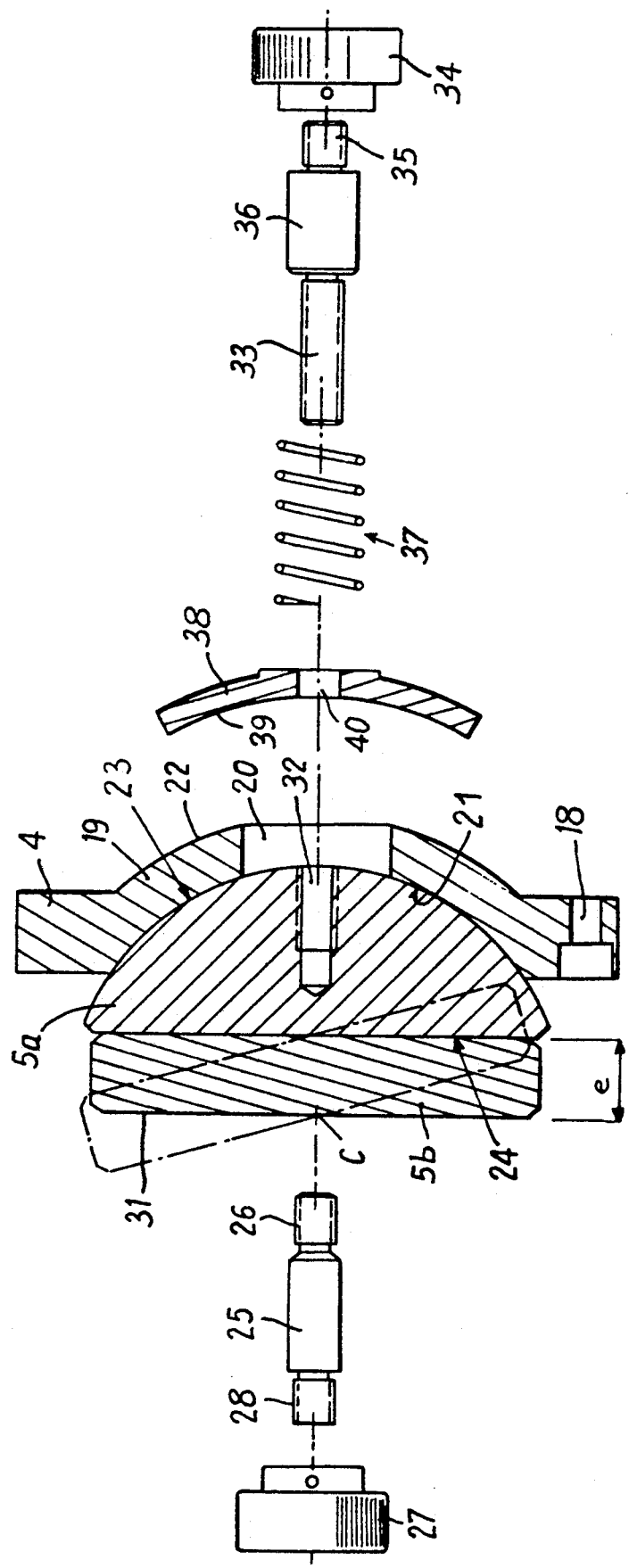

SYSTEM FOR MATERIALIZING A POINT IN SPACE, APPLICATIONS THEREOF AND A TOOLING ASSEMBLY FOR SAID SYSTEM

BACKGROUND OF THE INVENTION

The present invention relates to a system for materializing points in space, as well as applications thereof, particularly the placing of positioning references or workpieces, on mechanical assembly frames. It also relates to the tooling assemblies for said system.

In complex mechanical assemblies, for example in aeronautic equipment construction, for precisely positioning a structural assembly with respect to another, it is necessary to bring into alignment or coincidence reference points related to said structural assemblies.

Furthermore, in order to facilitate positioning of said structural assemblies with respect to each other, it is usual to materialize said reference points by positioning reference marks. Of course, it is then necessary to accurately adjust the position of said positioning reference marks on said reference points. Up to now, the adjustment of the reference points of the manufacturing or assembly frames in workshops has been carried out by positioning templates and standard gauges on said frames for accurately materializing these reference points.

Thus, on new frames, these templates and standard gauges make it possible to fix the position of each of these reference points at the beginning of manufacture and, on the frames in service, they make it possible to check periodically the positioning fidelity of these reference points and, if required, re-align them on their original position.

This method of adjustment involves manufacturing numerous and cumbersome templates or standard gauges and requires awkward and costly management of all these tooling assemblies for periodically checking the frames.

SUMMARY OF THE INVENTION

The object of the present invention is to provide a system for readily and accurately aligning reference points related to the structural assemblies to be aligned and, when these reference points are materialized by positioning reference marks, to readily adjust the latter. In particular, the present system makes it possible to avoid using the templates/gauges systems discussed above (and thereby avoid the problems incident to these templates/gauges systems). Instead of templates and/or gauges, the present system utilizes an optical computerized adjustment method which allows the user to simply implement a variety of operational tooling assemblies which may be easily adjusted within a workshop as required depending upon the task being performed. Drawbacks are avoided which are bound up with the diversity and plurality of templates and standard gauges of the prior art.

For this, according to the invention, the system for materializing in space a point whose coordinates in a system of reference axes are known, is remarkable in that it comprises:

an optical aiming apparatus, occupying a pre-determined position with respect to said system of axes and making it possible to determine, in said system of axes, the coordinates of any point aimed at, and a tooling assembly comprising a stand, one part at least of which is movable with respect to said system of axes and a hemispherical ball joint mounted in a spherical concave seat fixed to said movable part of the stand, the center of said ball joint being marked so as to be visible by said aiming apparatus.

Thus, as will be explained in greater detail hereafter, it is possible by successive approximations to cause the center of said ball joint to coincide with said point.

To achieve perfect coincidence, for each intermediate step it is necessary to determine the difference between the coordinates of said center and those of said point to be materialized. To facilitate computation, it is advantageous for said aiming apparatus to be formed by a remote data-processing measurement system having electronic theodolites connected to a computer. Numerous data-processing remote measurement systems are known which can be used for implementing the invention. Such systems are for example manufactured and sold by the American firm HEWLETT PACKARD, as well as by the Swiss firm WILD HEERBRUGG and KERN S.A. and the German firm ERNST LEITZ WETZLAR. They generally comprise two electronic theodolites connected to a specific computer.

To bring the center of said ball joint progressively into coincidence with the point to be materialized, it is advantageous for the movable part of the stand to be formed by a crossed movement table, generally called X Y Z table.

It will be noted that theoretically, for a given position of said seat, the center of said ball joint occupies a fixed position in space whatever the orientation of said ball joint with respect to said seat.

So that this result may be obtained in practice, said hemispherical ball joint is urged resiliently against its seat. Means may be provided for adjusting the resilient pressure of said hemispherical ball joint against its seat, so that said ball joint may, depending on the needs, either be oriented with respect to said seat or on the contrary occupy a fixed position with respect thereto. It may also be advantageous for said hemispherical ball joint to be removably mounted in said seat.

Advantageously, the system according to the invention may be used for placing a pinpoint positioning reference mark carried by a support. In this case, the portion of said hemispherical ball joint carrying the mark of the center thereof is removable, so that it can be replaced by said support of the positioning reference mark in such a way that this reference is at the position of the center of said ball joint. It is then advantageous for said removable part of the hemispherical ball joint to be in the form of a disk and for said support of said positioning reference to be in the form of a plate, having the same thickness as said disk.

Similarly, with the system according to the invention, an oriented axis may be positioned which is defined by two pinpoint positioning references marks carried by a common support. In this case two tooling assemblies are used and, after bringing the centers of the ball joints of said tooling assemblies to the points which said pinpoint positioning reference marks are to respectively occupy for positioning the support of said oriented axis, said common support materializing the oriented axis is substituted for the removable parts of said ball joints so that each of said positioning reference marks is at the position of the center of the corresponding ball joint.

Similarly also, the system according to the invention makes it possible to position a structural assembly whose position is defined by three pinpoint positioning reference marks carried by said structural assembly. In this case three tooling assemblies are used and, after bringing the centers of the ball joints of said tooling assemblies to the points which the three pinpoint reference marks for positioning said structural assembly are to occupy respectively, said assembly is substituted for the removable parts of said ball joints so that each of said positioning reference marks is at the position of the center of the corresponding ball joint.

It will be noted that, because of the invariability of position of the center of the ball joints with respect to the orientation thereof, it is then possible to modify the orientation of some of said ball joints for adapting them to the parts of said common support on which they are fixed.

In order to be able to materialize a reference plane passing through a point whose coordinates are known, according to the invention said hemispherical ball joint is made fast with two arms, whose free ends each carry an aiming mark. Thus, said marks may define a plane to be materialized in cooperation with the center of said ball joint which defines said point through which said plane is to pass.

Preferably, in this case means are provided for controlling the orientation of the axis of symmetry of the ball joint with respect to its seat. It is advantageous for said aiming marks to define, with said center of the ball joint, a diametrical plane of symmetry for the latter. One of the marks may then be located on the axis of symmetry of said ball joint and the other of said marks may be located on an axis orthogonal to said axis of symmetry and passing through the center of the ball joint.

If it is desired to accurately position a reference member, a reference face may be provided integral with said ball joint and capable of carrying said reference member. Since the reference face is fast with said ball joint, its plane is related to that of the plane defined by the center of the ball joint and by said marks and, consequently, positioning of said face may be obtained by positioning the latter plane.

The present invention also relates to the ball joint tooling assembly for implementing the present invention.

BRIEF DESCRIPTION OF THE DRAWINGS

The figures of the accompanying drawings will better show how the invention may be carried out. In these figures, identical references designate similar elements FIGS. 2, 3 and 4 are respectively rear, side and top views of a first embodiment of a ball joint tooling assembly according to the invention, FIG. 5 is an exploded view in cross section of one example of mounting the ball joint, more particularly for positioning a plane reference and comprising a two part ball joint, FIG. 6 is a front view of the seat of the ball joint, FIG. 7 is a front view of the removable part of the ball joint, FIG. 8 is a front view of the spherical portion of the ball joint, FIG. 9 is an enlarged cross section through line IX—IX of FIG. 8, FIGS. 10, 11 and 12 illustrate positioning of the support having three pinpoint positioning references, FIG. 13 is a perspective view of a second embodiment of a tooling assembly according to the invention, for defining a plane.

DESCRIPTION OF THE PREFERRED EMBODIMENTS

Figure 1:
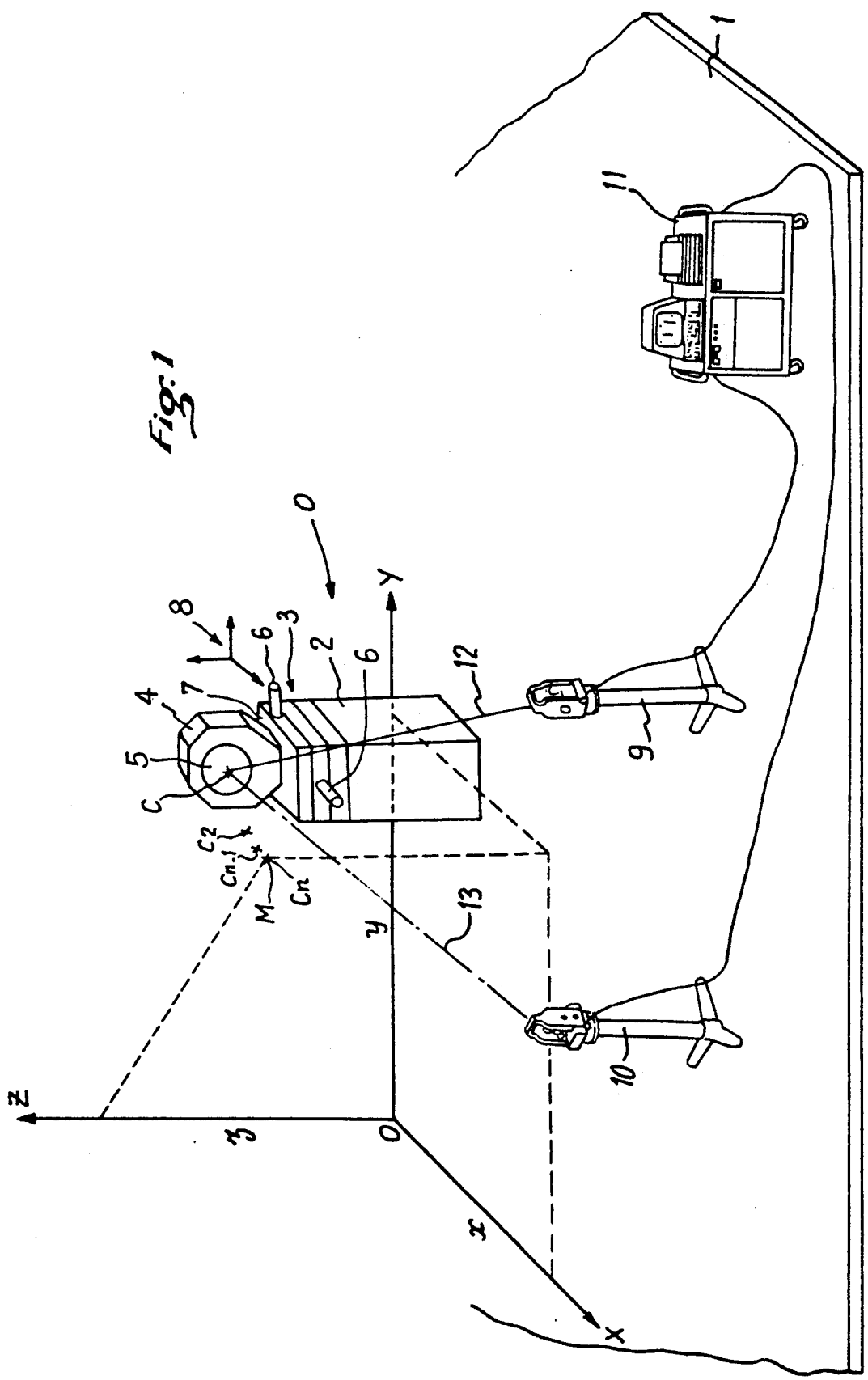
FIG. 1 is a schematic view illustrating the implementation of the system according to the invention.

In FIG. 1 a fixed support 1 has been shown, for example a floor, the ground, etc. and a system of reference axes OX, OY and OZ in which the coordinates x, y and z of a point M are known. A tooling assembly 0, resting on support 1, comprises a stand 2 whose portion 3 is formed by a crossed movement table (X Y Z table) carrying the seat 4 of a hemispherical ball joint 5. The assembly formed by table 3, seat 4 and ball joint 5 will be described in detail hereafter. Table 3 comprises control members 6 for communicating to its upper plate 7 (and so to seat 4 and ball joint 5) movements (symbolized by the trihedron 8), with respect to the axes OX, OY and OZ and the center C of the ball joint is marked, for example by an added sighting mark, spot or indentation.

Furthermore, the system comprises a remote measurement data-processing apparatus comprising two electronic theodolites 9 and 10 and a computer 11, capable of determining the coordinates of a point aimed at conjointly by said theodolites.

The system according to the invention, shown schematically in FIG. 1, then operates as follows. First of all, stand 2 and the elements 3 to 7 which it supports are brought into a position such that the center C is located in the vicinity of a point M to be materialized. Then, the center C of ball joint 5 is aimed at using the theodolites 9 and 10 (sighting lines 12 and 13) and with computer 11 the coordinates x1, y1 and z1 of said center C are determined. It will be understood that, except for an unlikely chance, the measured coordinates x1, y1 and z1 of C are different from the coordinates x, y and z of point M. These coordinates x1, y1 and z1 and x, y and z are compared two by two by the computer 11 and the control members 6 are operated manually in the appropriate direction for reducing the differences x-x1, y-y1 and z-z1, namely for bringing center C closer to the point M to be materialized after a first action on said control members 6, center C then occupies a position C2. Then the center C is aimed at, in position C2, using the theodolites 9 and 10 and the new measured coordinates x2, y2 and z2 are examined. They are again compared with coordinates x, y and z of point M and, if required, members 6 are again operated for bringing center C even closer to point M. A new adjustment is made so that center C occupies a new position closer to M.

It will be readily understood that, by successive approximations, it is possible to obtain for center C, at the end of the $n^{th}$ operation of members 6, a position Cn such that the corresponding measured coordinates xn, yn and zn are respectively equal to x, y and z. At this moment, center C strictly occupies the position of point M, which it then materializes.

Figure 2:
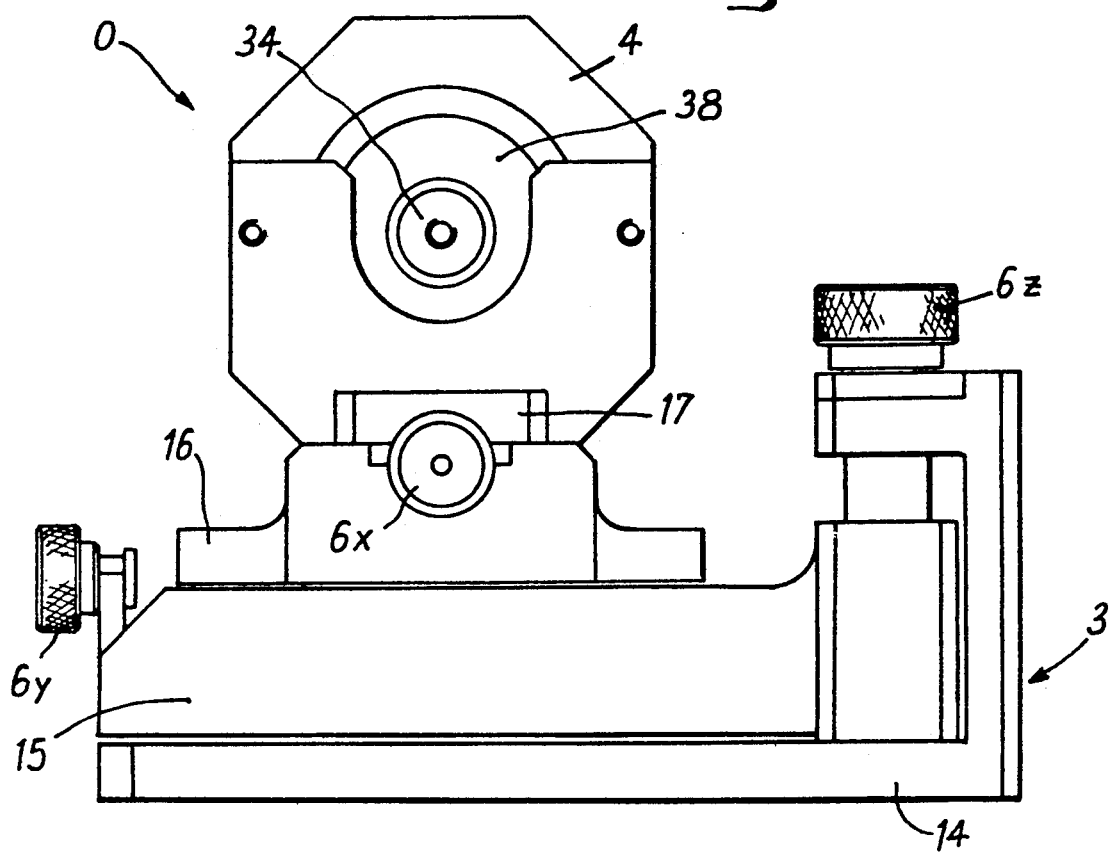
Figure 3:
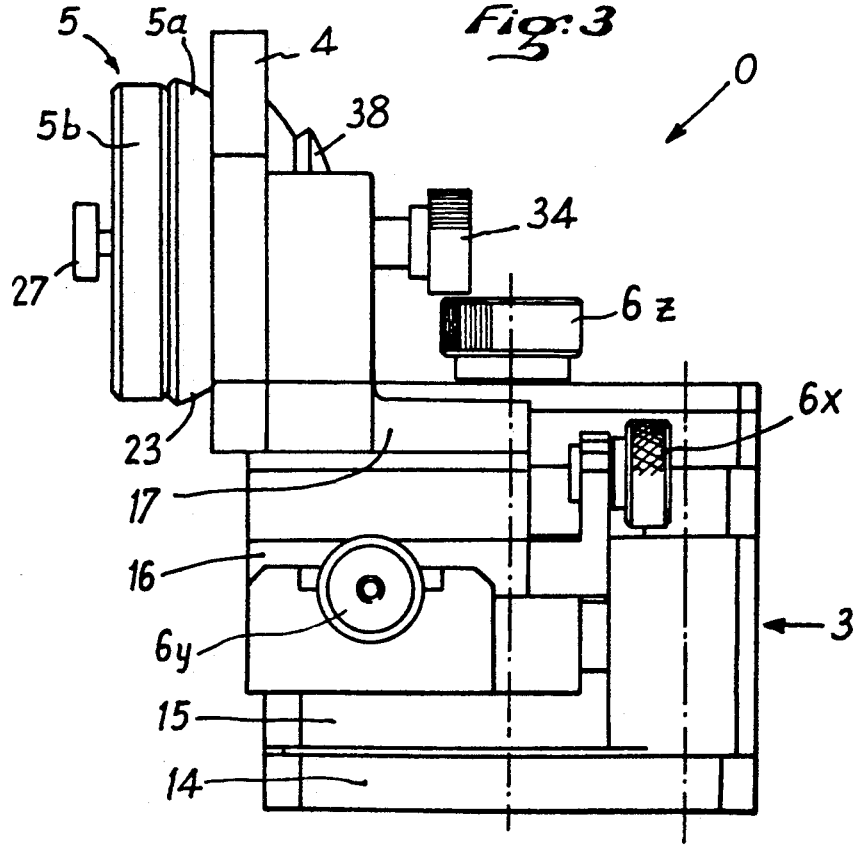

The method of forming the ball joint tooling assembly 0 according to the invention, illustrated in FIGS. 2 to 4, comprises as was mentioned above a crossed movement table 3 and a seat 4—ball joint 5 assembly.

Table 3 may be of any known type. The one shown in the Figures comprises a base 14, forming stand 2 (or disposed on a stand 2), a plate 15 mounted on said base 14 so as to be movable parallel to axis OZ (under the action of a control member 6 bearing the reference 6Z), a carriage 16 mounted for sliding on plate 15 so as to be movable parallel to a first direction orthogonal to axis OZ (under the action of a control member 6 bearing the reference 6Y) and a carriage 17 mounted for sliding on carriage 16 so as to be movable parallel to a second direction orthogonal to axis OZ (under the action of a control member 6, bearing the reference 6X).

The spherical seat 4 is fixed in any appropriate way on carriage 17, for example by means of screws (not shown) which are screwed into said carriage and pass through said seat through holes 18 (see FIGS. 5 and 6). It comprises a spherical wall 19, formed at its center with an opening 20 and defining, on the concave side, a spherical cup 21 and, on the convex side, a spherical projection 22. The spherical surfaces of cup 21 and projection 22 are concentric.

The hemispherical ball joint 5 shown is formed of two portions 5a and 5b, which are assembled together. Portion 5a comprises a spherical surface 23 having the same diameter as the spherical cup 21. Portion 5b is in the form of a flat disk, which can be fixed to the flat face 24 of the spherical portion 5a by means of tenons 25 having threaded ends 26 and controlled by control heads 27 fixed to the other end 28. Tenons 25 pass with an easy fit through portion 5b through holes 29 and are screwed, by their threaded ends 26, into tapped holes 30 of the spherical portion 5a, opening into said flat face 24. The center C of the hemispherical ball joint 5 is materialized on the face 31 of portion 5b, opposite the flat face 24 of portion 5a.

In its spherical portion, part 5a is pierced with a tapped hole 32, in which a screw 33 may be screwed passing through opening 20 and of a smaller diameter than the latter. A control head 34 is provided at one end 35 of said screw 33, which comprises a shoulder 36 against which one end of a spring 37 bears. A spherical washer 38 is further provided whose concave spherical face 39 has the same diameter as the spherical projection 22. A central hole 40 allows screw 33 to pass through said washer 38.

Thus, because of the cooperation of the tapped hole 32, of screw 33 and spring 37, through which screw 33 passes and which is inserted between washer 38 and shoulder 36, the spherical surface 23 of portion 5a is urged resiliently against the spherical cup 21 of seat 4. Furthermore, because of the spherical washer 38 whose concave spherical face 39 bears on the spherical projection 22 of seat 4 and because the diameter of opening 20 is large with respect to that of screw 23, the ball joint 5 may rotate in a limited way in its seat 4, when the pressure exerted by the compressed spring 37 is not too high. On the other hand, if screw 33 is screwed sufficiently into portion 5a, the compression of spring 37 prevents any movement of ball joint 5 with respect to seat 4.

It will be further noted that, since the assembly of portions 5a and 5b forms a hemispherical ball joint, the center C always occupies the same position, whatever the orientation of said ball joint with respect to the seat (this is shown with a chain dotted line in FIG. 5).

In FIGS. 10, 11 and 12 application of the system according to the invention, with tooling assemblies 01, 02, 03 of the type described in connection with FIGS. 2 to 9, has been illustrated schematically for positioning, on stand 41, a plate 42 comprising three positioning reference marks R1, R2 and R3 which are to occupy respectively the coplanar spatial positions M1, M2, M3, the thickness of this plate 42 being equal to that e of the disks 5b of the ball joints of the three tooling assemblies. In addition, said plate comprises holes 43 which are identical in diameter and arrangement to holes 29 of the three disks 5b and occupying, with respect to the reference marks R1, R2 and R3, relative positions identical to those occupied by holes 29 with respect to centers C1, C2 and C3.

In this application, according to the procedure described in connection with FIG. 1, the centers C1, C2 and C3 of the tooling assemblies 01, 02 and 03 are brought successively in respective coincidence with the positions M1, M2, M3 (FIG. 10). Then, portions 5b of the three ball joints are removed by unscrewing screws 26 by means of heads 27 and, on the three ball joints, the plate 42 is fixed by means of tenons 25 passing through holes 43 in plate 42 and being screwed again into the tapped holes 30 of portions 5a. It will be readily understood that the reference marks R1, R2 and R3 are then respectively in coincidence with positions M1, M2 and M3 (FIG. 11).

It will be noted that, in the case—the most frequent—where the three faces 24 of the spherical portions 5a are not coplanar after centers C1, C2, C3 have been placed in coincidence with positions M1, M2, M3, self correction occurs at the time of fixing plate 42 on the spherical portions 5a, since the latter may be caused to orientate themselves with respect to their seat 4. Because these spherical portions 5a then rotate about their respective centers C1, C2 and C3, there is no loss of adjustment of the coincidence thereof with the positions M1, M2 and M3. If required, it is possible to check the adjustment of reference marks R1, R2 and R3 by using the procedure described in connection with FIG. 1.

It can be seen that it is also possible, after centers C1, C2 and C3 have been caused to coincide with positions M1, M2 and M3 to completely remove the ball joints 5 from said tooling assemblies 01, 02 and 03 (by operating heads 34) then separating portions 5a from portions 5b, to replace portions 5b by plate 42, then to refit the assembly formed by plates 42 and portions 5a which are integral therewith on seats 4.

After the reference marks R1, R2 and R3 have been caused to coincide with position M1, M2 and M3 (FIG. 11), it remains to fix plate 42 on stand 41. This may be accomplished for example by sealing lugs 44, fast with said plate 42, in sealing pots 45 of said stand 41, using a sealing means 46 (FIG. 12).

The variant of the tooling assembly 0 according to the invention shown in FIG. 13, comprises as described above a table 3 with three crossed movements X Y Z which can be controlled by control members 6, a spherical seat 4 and a hemispherical ball joint 5 whose center C is marked. It comprises in addition two rectangular arms 47 and 48 fast with ball joint 5 and having at their respective free ends marks D and E. For example, mark D is located on the axis of symmetry 49 of the hemispherical ball joint 5 and the mark E on a diametrical axis 50 of said ball joint, so that marks C, D and E define an axial diametrical plane thereof. Moreover, in this variant, means 51 are provided for controlling the rotation of arm 48 about axis 49, means (not shown in the FIG.) for controlling rotation of arm 47 about axis 50 and means 52 for controlling the rotation of arms 47 and 48 about an axis 53, orthogonal to axes 49 and 50 and passing through center C. These different rotation control means comprise for example bearings 54 and knurled wheels 55 cooperating with threaded rods 56.

It can be seen that with such a device it is possible to materialize a reference plane. A face 57 related to said ball joint 5 and to said arms 47 and 48 may then be positioned precisely.

Figure 14:
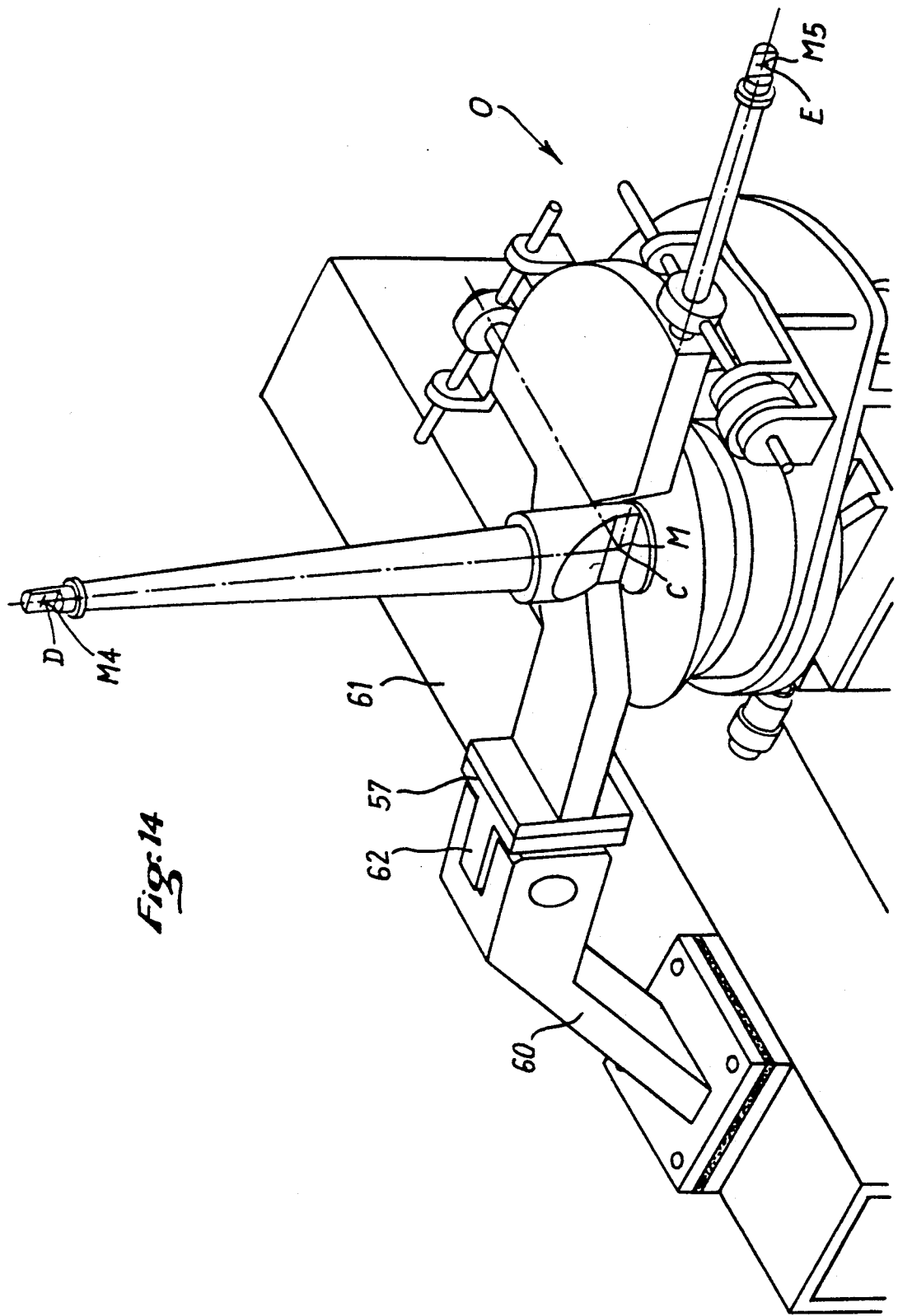
FIG. 14 illustrates the use of the tooling assembly of FIG. 13 for positioning a reference member.

In FIG. 14, the application has been illustrated which consists in placing, precisely in position and orientation, a reference member 60 in the form of a fork joint on a stand 61.

For this, in a system of reference axes, the coordinates of points M, M4 and M5 are first of all determined theoretically which the center C and marks D and E are to occupy respectively, in the case where, with said reference member mark 60 correctly positioned, it is related to said face 57, possibly through an interface device 62. When these coordinates are determined, center C of ball joint 5 is brought into coincidence with point M, using the procedure described in connection with FIG. 1. Then, by tilting the assembly 5, 47, 48 with respect to seat 4, for example by controlling means 55, 56 and aiming using the apparatus 9, 10, 11, marks D and E are brought successively respectively to positions M4 and M5 using a procedure similar to that used for positioning center M. It is then certain that face 57 occupies the appropriate position. It is then sufficient to connect reference 60 to said face 57, through the interface device 62, so that the reference member 60 occupies its precise correct position with respect to stand 61. It is then sufficient to fix the reference member 60 on stand 61, by any appropriate means.

What is claimed is:

1. A system fore materializing in space a point whose coordinates in a system of reference axes are known, comprising:

an optical aiming apparatus, occupying a pre-determined position with respect to said system of axes and making it possible to determine, in said system of axes, the coordinates of any point aimed at, and a tooling assembly comprising a stand, one part at least of which is movable with respect to said system of axes and a hemispherical ball joint mounted in a spherical concave seat fixed to said movable part of the stand, the center of said ball joint being marked so as to be visible by said aiming apparatus.

2. The system as claimed in claim 1, wherein said optical aiming apparatus is formed by a remote data-processing measurement system having electronic theodolites connected to a computer.

3. The system as claimed in claim 1, wherein said movable part of the stand is formed by a crossed movement table.

4. The system as claimed in claim 1, wherein said hemispherical ball joint is urged resiliently against its seat.

5. The system as claimed in claim 4, comprising means for adjusting the resilient pressure of said hemispherical ball joint against its seat, so that said ball joint may either be oriented with respect to said seat or on the contrary locked in a fixed position with respect thereto.

6. The system as claimed in claim 1, wherein said hemispherical ball joint is removably mounted in said seat.

7. The system as claimed in claim 1, for placing a pinpoint positioning reference mark with respect to a support, wherein the portion of said hemispherical ball joint carrying the mark of the center thereof is removable, and can be replaced by said support of the positioning reference mark so that this reference mark is located at the position of the center of said ball joint.

8. The system as claimed in claim 7, wherein said removable part of the hemispherical ball joint is in the form of a disk and said support of said positioning reference mark is in the form of a plate, having the same thickness as said disk.

9. The system as claimed in claim 1 for materializing a plane passing through a point whose coordinates in a system of reference axes are known, wherein said hemispherical ball joint is made fast with two arms, whose free ends each carry an aiming mark.

10. The system as claimed in claim 9, comprising means for controlling the orientation of the axis of symmetry of said ball joint with respect to its seat.

11. The system as claimed in claim 9, wherein said aiming marks define, with said center of the ball joint, a diametrical plane of symmetry for the latter.

12. The system as claimed in claim 9, where one of said marks is located on the axis of symmetry of said ball joint and the other of said marks is located on an axis orthogonal to said axis of symmetry and passing through said center of the ball joint.

13. The system is claimed in claim 9, for positioning a reference member, comprising a reference face integral with said ball joint and capable of carrying said reference member.

14. A tooling assembly for materializing a point in space, comprising a stand, at least one part of which is movable and a hemispherical ball joint mounted in a concave spherical seat, fast with said movable part of said stand, the center of said ball joint being marked.

15. Tooling assembly as claimed in claim 14, wherein said movable part of the stand is formed by a crossed movement table.

16. The tooling assembly as claimed in claim 14, wherein said hemispherical ball joint is urged resiliently against its seat.

17. The tooling assembly as claimed in claim 16, comprising means for adjusting the resilient pressure of said hemispherical ball joint against its seat so that said ball joint may either rotate with respect to said seat or on the contrary occupy a position which is fixed with respect thereto.

18. The tooling assembly as claimed in claim 14, wherein said hemispherical ball joint is removably mounted in said seat.

19. The tooling assembly as claimed in claim 14, wherein the part of said hemispherical ball joint bearing the mark of the center thereof is removable.

20. The tooling assembly as claimed in claim 19, wherein said removable part of the hemispherical ball joint is in the form of a disk.

21. The tooling assembly as claimed in claim 14, wherein said hemispherical ball joint is fast with two arms whose free ends each bear an aiming mark.

22. The tooling assembly as claimed in claim 21, comprising means for controlling the orientation of the axis of symmetry of said ball joint with respect to the seat.

23. The tooling assembly as claimed in claim 21, wherein said aiming marks define, with the center of the ball joint, a diametrical plane of symmetry for the latter.

24. The tooling assembly as claimed in claim 21, wherein one of said marks is located on the axis of symmetry of said ball joint and the other of said marks is located on an axis orthogonal to said axis of symmetry and passing through said center of the ball joint.

25. The tooling assembly as claimed in claim 21, comprising a reference face integral with said ball joint.

26. A system for positioning an oriented axis defined by two pinpoint positioning reference marks carried by a common support and the coordinates of which are known in a system of reference axes, comprising:
- an optical aiming apparatus, occupying a pre-determined position with respect to said system of axes and making it possible to determine, in said system of axes, the coordinates of any point aimed at; and
- two tooling assemblies, each comprising a stand, one part at least of which is movable with respect to said system of axes and a hemispherical ball joint mounted in a spherical concave seat fixed to said movable part of the stand, the center of said ball joint being marked so as to be visible by said aiming apparatus, the portion of each hemispherical ball joint carrying a mark of the center thereof being removable, and able to be replaced by said common support of the positioning reference marks so that a reference mark is located at the position of the center of the corresponding ball joint;
- whereby, after bringing the centers of the ball joints of said tooling assemblies to the points which said pinpoint positioning reference marks are to occupy, said common support materializing the oriented axis is substituted for the removable parts of said ball joints so that each of said positioning reference marks is located at the position of the center of the corresponding ball joint.

27. A system for positioning a structural assembly comprising three pinpoint positioning reference marks carried by a common support, and the coordinates of which are known in a system of reference axes, comprising:
- an optical aiming apparatus, occupying a predetermined position with respect to said system of axes and making it possible to determine, in said system of axes, the coordinates of any point aimed at; and
- three tooling assemblies, each comprising a stand, one part at least of which is movable with respect to said system of axes and a hemispherical ball joint mounted in a spherical concave seat fixed to said movable part of the stand, the center of said ball joint being marked so as to be visible by said aiming apparatus, the portion of each hemispherical ball joint carrying a mark of the center thereof being removable, and able to be replaced by said common support of the positioning reference marks so that a reference mark is located at the position of the center of the corresponding ball joint;
- whereby, after bringing the centers of the ball joints of said tooling assemblies to the points which said pinpoint reference marks are to occupy respectively, said common support is substituted for the removable parts of said ball joints so that each of said positioning reference marks is located at the position of the center of the corresponding ball joint.

* * * * *